United States Patent [19]

Sato

[11] Patent Number: 4,633,675
[45] Date of Patent: Jan. 6, 1987

[54] DEVICE FOR CONTROLLING THE CAPACITY OF A VARIABLE CAPACITY COMPRESSOR

[75] Inventor: Motoharu Sato, Honjo, Japan

[73] Assignee: Sanden Corporation, Gunma, Japan

[21] Appl. No.: 823,363

[22] Filed: Jan. 28, 1986

[30] Foreign Application Priority Data

Feb. 1, 1985 [JP] Japan .................................. 60-16397

[51] Int. Cl.⁴ ............................................. F25B 41/00
[52] U.S. Cl. ..................................... 62/208; 62/228.5; 62/229
[58] Field of Search ....................... 62/228.1, 226, 227, 62/196.1, 196.2, 196.3, 208, 209, 215, 228.4, 228.5, 229, 244, 323.4, 510, 176.3; 236/1 EA

[56] References Cited

U.S. PATENT DOCUMENTS

| 4,326,386 | 4/1982 | Tamura .................................. 62/150 |
| 4,358,936 | 11/1982 | Ito et al. ............................... 62/229 |
| 4,485,634 | 12/1984 | Yasuda et al. ...................... 62/196.2 |
| 4,485,635 | 12/1984 | Sakano ................................. 62/209 |
| 4,539,821 | 9/1985 | Tamura ............................... 62/228.5 |
| 4,582,124 | 4/1986 | Yoshimi et al. .................. 62/229 X |

Primary Examiner—Harry Tanner
Attorney, Agent, or Firm—Banner, Birch, McKie & Beckett

[57] ABSTRACT

A control device for a variable capacity compressor in an automotive air conditioning system. The control device includes a first sensor disposed forward of the evaporator and a second sensor disposed behind the evaporator. The control device compares the air temperature detected by the sensors with predetermined temperatures, and controls the capacity of the compressor in accordance with the compared results.

25 Claims, 6 Drawing Figures

DEVICE FOR CONTROLLING THE CAPACITY OF A VARIABLE CAPACITY COMPRESSOR

TECHNICAL FIELD

The present invention relates to a device for controlling the capacity of a variable capacity type compressor in an automotive air conditioning system, and more particularly, to a device which controls the capacity of the compressor in accordance with the air conditioning load.

BACKGROUND OF THE INVENTION

Generally, the air conditioning system of an automobile is driven by the vehicle engine through an electromagnetic clutch. The air conditioning system is designed to achieve a predetermined air conditioning performance at a predetermined air conditioning load when the automobile is driven at an average speed. Thus, when the vehicle engine is idling or is being driven at low speeds, the rotational speed of the compressor is correspondingly low. Therefore, the performance of the air conditioning system is adversely effected. On the other hand, when the vehicle is driven at high speeds, the rotational speed of the compressor is to high for efficient performance. Thus, electromagnetic clutches are used to control the rotational speed of the compressor under varying drive speeds by intermittently stopping and starting the compressor.

However, there are many problems associated with continuously cycling the clutch on and off. For example, when the engine is driven at high speeds and the capacity of the air conditioning system is large, it is necessary for the electromagnetic clutch to be turned on or off frequently. On the other hand, at low speed or when the vehicle engine is idling, the compressor is not sufficiently driven to maintain the desired temperature in the vehicle.

In order to solve the abovementioned problems, a system which controls the capacity of a compressor by detecting the temperature at the outlet side of the air conditioning system evaporator is proposed in published Japanese Patent Application No. 58-30. In such a system, the performance of the air conditioning system is not directly detected. For example, even though the temperature in the inside of the vehicle may be high, the capacity of the air conditioning system is reduced when the temperature at the outlet side of the evaporator becomes lower than a predetermined temperature. Thus, the capacity of the system is insufficient to cool the vehicle. In addition, when the vehicle is running, the capacity of the air conditioning system is changed frequently, thereby placing great stress and strain on the air conditioning system.

SUMMARY OF THE INVENTION

It is therefore the overall object of the present invention to provide a device for controlling the capacity of a variable type compressor in an automotive air conditioning system in order to provide a more reliable and durable system than those known in the prior art.

It is another object of the present invention to provide a more reliable and durable automotive air conditioning system than those known in the prior art without increasing the complexity or cost of the system.

The above objects of the present invention are achieved by providing a control device which includes a first temperature detecting sensor disposed forward of the evaporator for detecting a first air temperature at the inlet side of the evaporator, a second temperature detecting sensor disposed behind the evaporator for detecting a second air temperature at the outlet side of the evaporator and a control unit. The control unit compares the detected air temperature with predetermined temperatures and controls the capacity of the compressor in accordance with the compared results.

Further objects, features and advantages of the present invention will be understood from the following detailed description of the preferred embodiments of the invention with reference to the attached drawings.

DETAILED DESCRIPTION OF THE PREFERRED EMBODIMENTS

Figure 1:
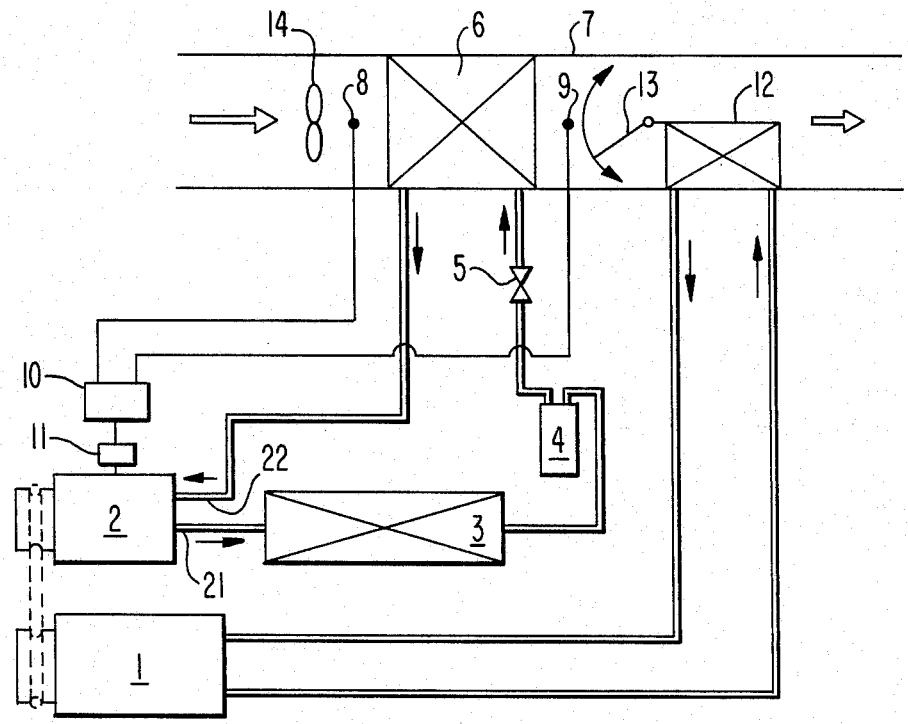
FIG. 1 is a block diagram of an automotive air conditioning system in accordance with the present invention.

With reference to FIG. 1, there is shown an automotive air conditioning system which is driven by engine 1. The air conditioning system comprises compressor 1, condenser 3, receiver-dryer 4, expansion valve 5 and evaporator 6 located between outlet port 21 and inlet port 22. Compressor 2 is driven by engine 1 and is a variable capacity compressor of the scroll type or swash plate type design. The capacity of compressor 2 can be varied by operating capacity changing mechanism 11 upon a signal from control unit 10. Where compressor 2 is of the scroll type, capacity changing mechanism 11 comprises an electromagnetic bypass valve which connects the inlet of the compressor to the intermediate fluid pockets through an intermediate chamber as shown in published Japanese Patent Application No. 57-148089.

As shown in FIG. 1, evaporator 6 is disposed in duct 7. Sensor 8 is disposed at the inlet side of evaporator 6 and sensor 9 is disposed at the outlet side of evaporator 6. Sensors 8 and 9 are connected to control unit 10. Control unit 10 compares the detected temperature valves with predetermined values and then sends appropriate capacity control signals to capacity changing mechanism 11 to effect a change in the capacity of the compressor or to start or stop the operation of the compressor.

Heater 12 disposed in duct 7 is connected to engine 1 and receives coolant from engine 1 for heating the vehicle when the outside temperature is cold.

Figure 2:
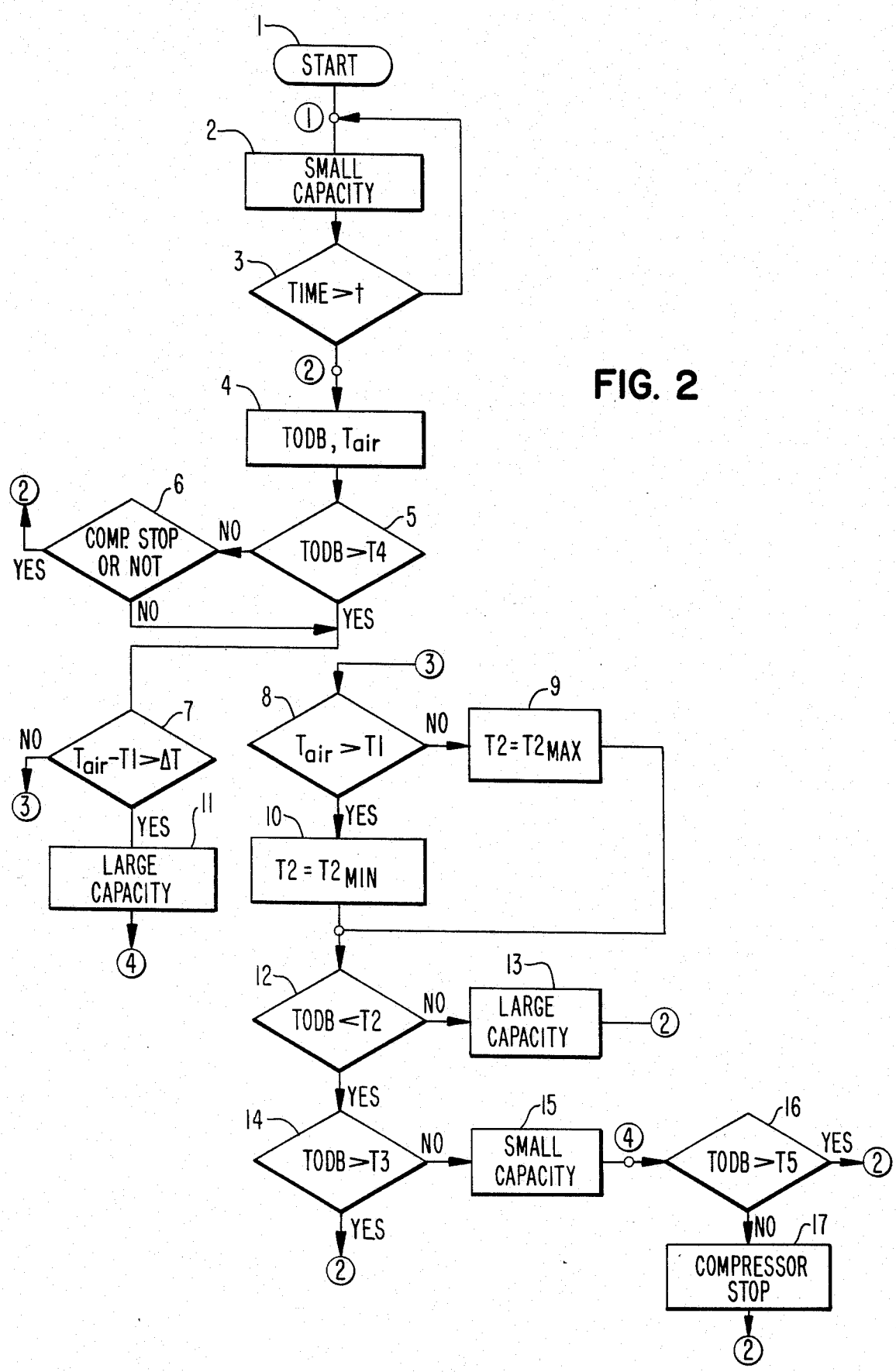
FIG. 2 is a flow chart illustrating the operation of the control system of the present invention.
Figure 3:
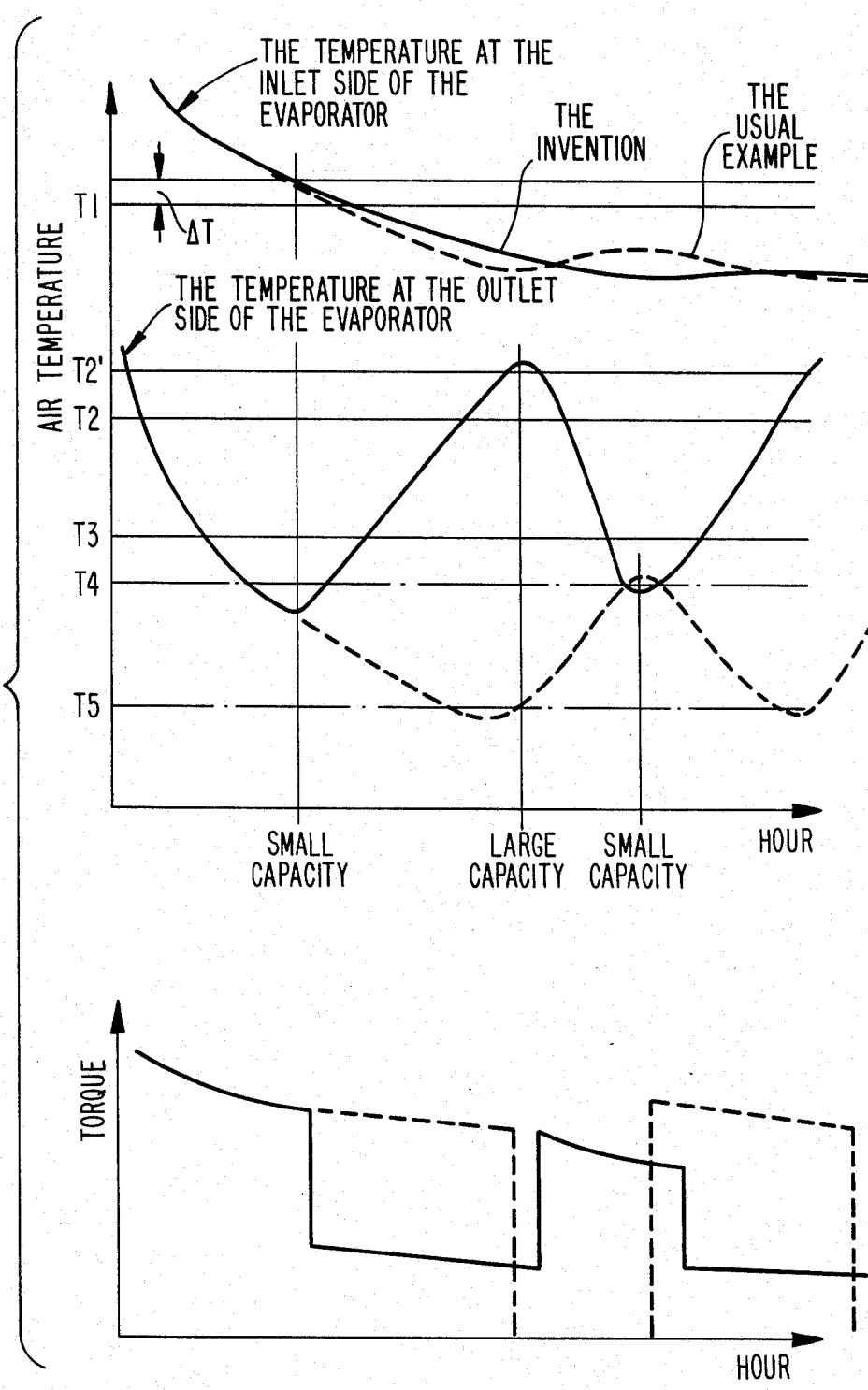
FIG. 3 is a graph illustrating the relationship between a high air conditioning load and normal vehicle speed.
Figure 4:
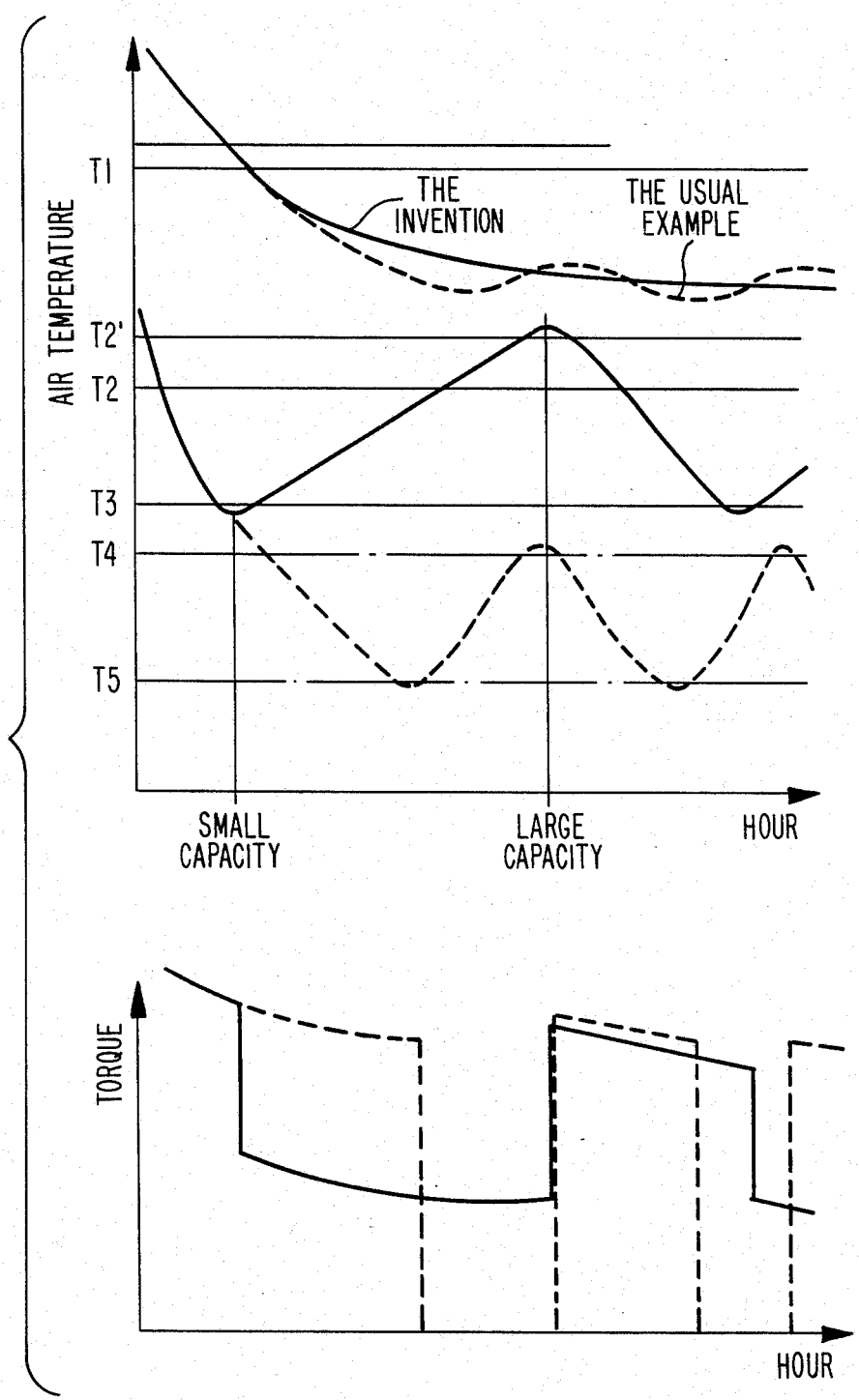
FIG. 4 is a graph illustrating the relationship between a high air conditioning load and high vehicle speed.
Figure 5:
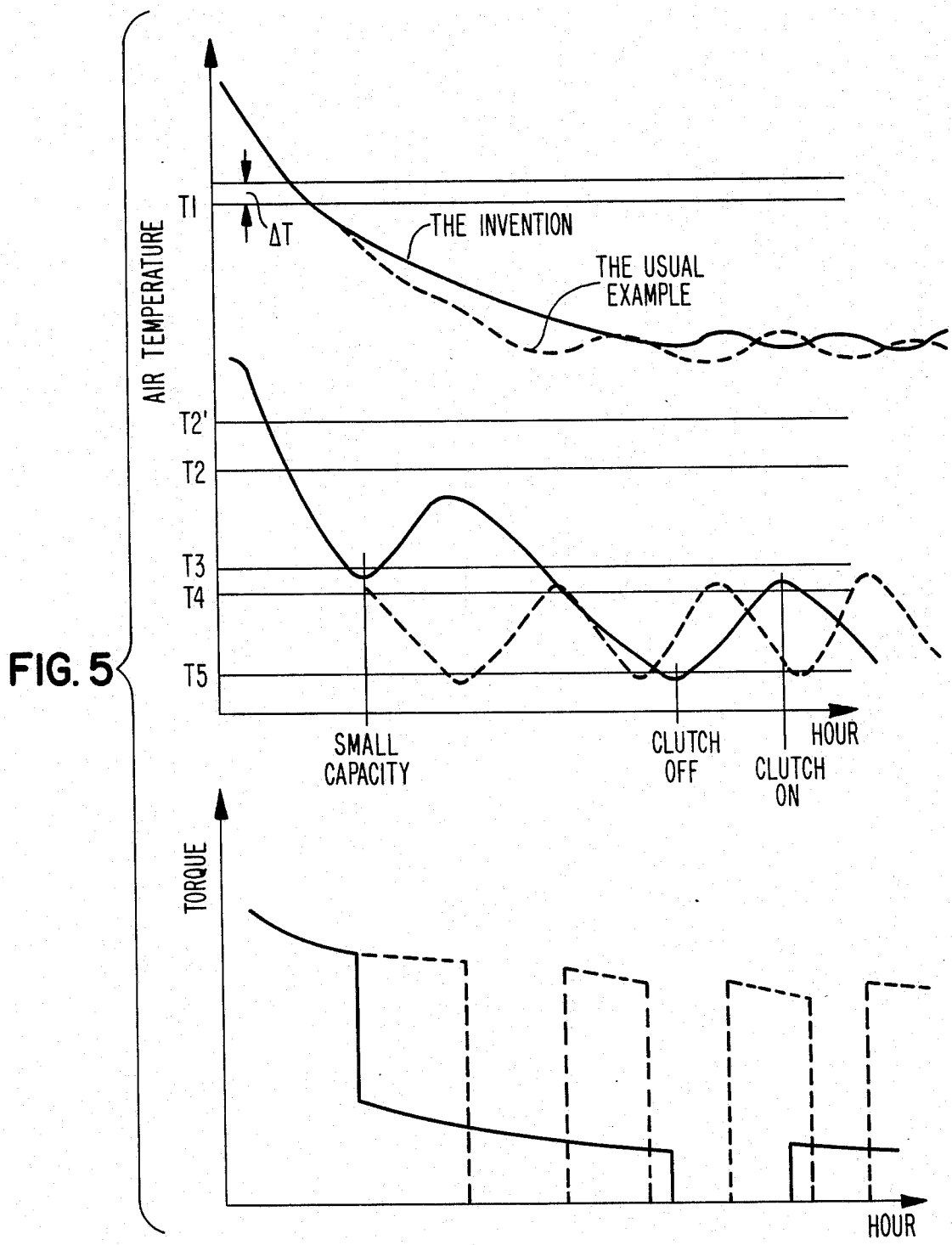
FIG. 5 is a graph illustrating the relationship between a low air conditioning load and normal vehicle speed.
Figure 6:
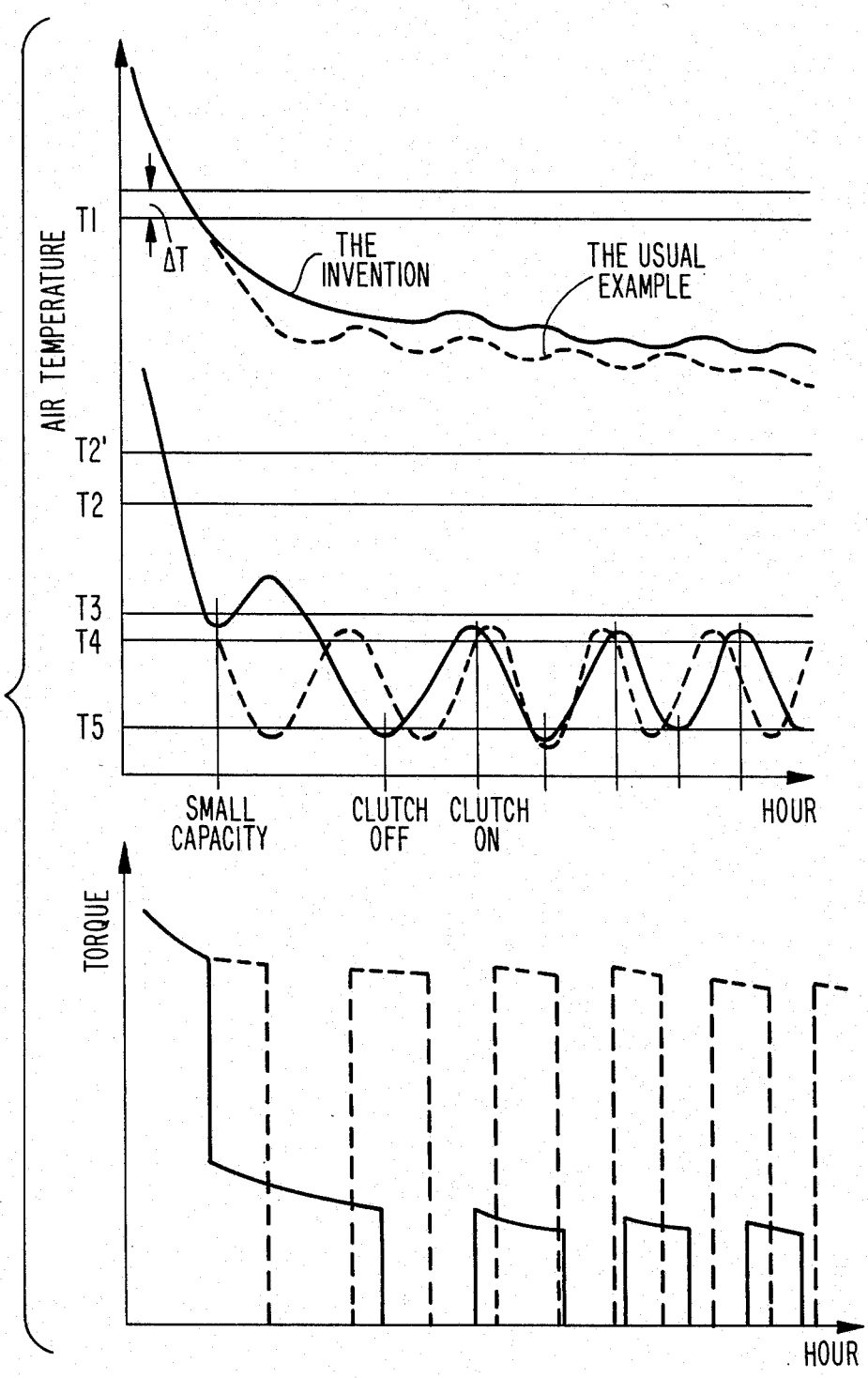
FIG. 6 is a graph illustrating the relationship between a low air conditioning load and high vehicle speed.

A damper 13 disposed forward of heater 12 controls the temperature of the discharged air by the angle of its opening being controlled. Blower 14 is also disposed forward of evaporator 6. With reference to FIG. 2, there is shown a flowchart which illustrates the operation of control unit 10.

When the air conditioning system is turned on in step 1, compressor 2 is operated at a predetermined small capacity (step 2). After the air conditioning system is operated for a predetermined time T (step 3), control passes to step 4. In the present invention time T may be, e.g., three seconds. In step 4, temperature TODB is detected by sensor 9 at the outlet side of evaporator 6 and is compared to predetermined temperature T4 in step 5. If the temperature TODB is higher than temperature T4, control pases to step 7. If temperature TODB is equal to or lower than temperature T4 control passes to step 6.

In step 6, a determination is made whether compressor 2 is operating. If compressor 2 is operating, control passes back to step 4. If, however, compressor 2 is not operating, control passes to step 7.

In step 7, temperature $T_{air}$ is detected by sensor 8 at the inlet side of evaporator 6. A predetermined temperature T1 is substracted from temperature $T_{air}$ and the resulting temperature is compared with a predetermined change in temperature $\Delta T$. If the resulting temperature is greater than temperature $\Delta T$, control passes to step 11 where the capacity of the compressor is changed to a high capacity. Control is then passed to step 16. If the resulting temperature is not greater than temperature $\Delta T$, control is passed to step 8.

In step 8, temperature $T_{air}$ is compared to predetermined temperature T1 and if $T_{air}$ is greater than T1, control passes to step 10. Otherwise, control passes to step 9. In step 10, a predetermined temperature T2 equal to $T2_{MIN}$ is established and control is passed to step 12. In step 9, a predetermined temperature T2 equal to $T2_{MAX}$ is established and control is also passed to step 12.

In step 12, temperature TODB is compared to temperature T2 and if T2 is greater than TODB, control is passed to step 14 otherwise control is passed to step 13. In step 13, the capacity of compressor 2 is changed to a large capacity and control returns to step 4. In step 14, temperature TODB is compared to predetermined temperature T3 and if TODB is greater than T3, control is passed to step 15. In step 15, the capacity of compressor 2 is changed to a small capacity and control passes to step 16.

In step 16, temperature TODB is compared to predetermined temperature T5 and if TODB is greater than T5 control is returned to step 4. Otherwise, control is passed to step 17. In step 17, the operation of the compressor is stopped, e.g., by deactivating the electromagnetic clutch. Control is then returned to step 4.

FIGS. 3, 4, 5 and 6, shown the relationship between air conditioning load, temperature and compressor torque over time. The solid lines represent a compressor controlled in the manner of the present invention and the dotted line represents a compressor controlled in the manner known in the prior art by cycling the electromagnetic clutch. As the figures clearly show, the present invention provides an air conditioning system which is more efficient in its operation and more responsive to variations than such systems known in the art.

The invention has been described in detail in connection with preferred embodiments. These embodiments are examples only and the invention is not restricted thereto. It will be easily understood by those skilled in the art that variations and modifications can be made to the invention within the scope of the appended claims.

What is claimed is:

1. A device for controlling the capacity of a variable capacity compressor having an evaporator and compressor capacity changing means, said device comprising:
first temperature detecting means disposed behind said evaporator for detecting a first air temperature at an outlet side of said evaporator;
second temperature detecting means disposed forward of said evaporator for detecting a second air temperature at an inlet side of said evaporator; and
control means for controlling said capacity changing means, said control means including
first comparison means for comparing a first predetermined temperature with said first air temperature and providing a first control signal when said first air temperature is higher than said first predetermined temperature,
second comparison means for comparing the difference between said second air temperature and a second predetermined temperature with a predetermined change in temperature in response to the comparison by said first comparison means and the presence of said first control signal, said second comparison means providing a second control signal when said difference in temperature is greater than said predetermined change in temperature, wherein said capacity changing means changes the capacity of said compressor to a large capacity in response to said second control signal,
third comparison means for comparing said second air temperature to said second predetermined temperature in response to the comparison by said second comparison means and the absence of said second control signal, said third comparison means providing a third control signal when said second air temperature is higher than said second predetermined temperature, wherein in response to said third control signal a third predetermined temperature is set to a first temperature and in the absence of said third control signal said third predetermined temperature is set to a second temperature,
fourth comparison means for comparing said first air temperature to said third predetermined temperature and providing a fourth control signal when said third predetermined temperature is higher than said first air temperature, wherein said capacity changing means changes the capacity of said compressor to a large capacity in the absence of said fourth control signal,
fifth comparison means for comparing said first air temperature to said fourth predetermined temperature in response to the comparison by said fourth comparison means and the presence of said fourth control signal, said fifth comparison means providing a fifth control signal when said first air temperature is higher than said fourth predetermined temperature, wherein said capacity changing means changes the capacity of said compressor to a small capacity in response to the absence of said fifth control signal, and
sixth comparison means for comparing said first air temperature with a fifth predetermined temperature in response to the comparison by said fifth comparison means and the absence of said fifth control signal, said sixth comparison means providing a sixth control signal when said first air temperature is higher than said fifth predetermined temperature, wherein said capacity changing means stops the operation of said compressor in response to said sixth control signal.

2. The device of claim 1 wherein said control means further includes determination means for determining whether said compressor is in an operating state in response to the comparison by said first comparison means and the absence of said first control signal, said determination means providing a seventh control signal when said compressor is in said operating state, in the absence of said seventh control signal said second comparison means being controlled to make said comparison between said difference temperature and said predetermined change in temperature.

3. The device of claim 2 wherein in response to the determination by said determination means and the presence of said seventh control signal said first temperature detecting means and said second temperature detecting means are controlled to detect said first air temperature and said second air temperature, respectively.

4. The device of claim 1 wherein in response to the comparison by said second comparison means and the presence of said second control signal said sixth comparison means is controlled to make said comparison between said first air temperature and said fifth predetermined temperature.

5. The device of claim 1 wherein in response to the comparison by said fourth comparison means and the absence of said fourth control signal said first temperature detecting means and said second temperature detecting means are controlled to detect said first air temperature and said second air temperature, respectively.

6. The device of claim 1 wherein in response to the comparison by said fifth comparison means and the presence of said fifth control signal said first temperature detecting means and said second temperature detecting means are controlled to detect said first air temperature and said second air temperature, respectively.

7. The device of claim 1 wherein in response to the comparison by said sixth comparison means and the presence of said sixth control signal said first temperature detecting means and said second temperature detecting means are controlled to detect said first air temperature and said second air temperature, respectively,.

8. The device of claim 1 wherein in response to the comparison by said sixth comparison means and the absence of said sixth control signal said first temperature detecting means and said second temperature detecting means are controlled to detect said first air temperature and said second air temperature, respectively.

9. The device of claim 1 wherein said control means initially controls said capacity control means to operate said compressor at a small capacity for an initial predetermined time.

10. The device of claim 9 wherein said predetermined time is less than five seconds.

11. The device of claim 1 wherein said third predetermined temperature is less than said second predetermined temperature.

12. The device of claim 11 wherein said fourth predetermined temperature is less than said third predetermined temperature.

13. The device of claim 12 wherein said first predetermined temperature is less than said fourth predetermined temperature.

14. The device of claim 13 wherein said fifth predetermined temperature is less than said first predetermined temperature.

15. The device of claim 1 wherein said first temperature associated with said third predetermined temperature is less than said second temperature associated with said third predetermined temperature.

16. The device of claim 1 wherein said control means is a microprocessor.

17. In a variable capacity compressor having an evaporator and compressor capacity changing means, a method for controlling said capacity changing means, said method comprising the steps of:

detecting a first temperature at the outlet side of said evaporator;

detecting a second temperature at the inlet side of said evaporator;

comparing a first predetermined temperature with said first air temperature and providing a first control signal when said first air temperature is higher than said first predetermined temperature;

comparing the difference between said second air temperature and a second predetermined temperature with a predetermined change in temperature in response to the presence of said first control signal, providing a second control signal when said difference in temperature is greater than said predetermined change in temperature, wherein said capacity changing means is controlled to change the capacity of said compressor to a large capacity in response to said second control signal;

comparing said second air temperature to said second predetermined temperature in response to the absence of said second control signal, providing a third control signal when said second air temperature is higher than said second predetermined temperature, wherein in response to said third control signal, setting a third predetermined temperature to a first temperature and in the absence of said third control signal, setting said third predetermined temperature to a second temperature;

comparing said first air temperature to said third predetermined temperature and providing a fourth control signal when said third predetermined temperature is higher than said first air temperature, controlling said capacity changing means to change the capacity of said compressor to a large capacity in the absence of said fourth control signal;

comparing said first air temperature to said fourth predetermined temperature in response to the presence of said fourth control signal, providing a fifth control signal when said first air temperature is higher than said fourth predetermined temperature, controlling said capacity changing means to change the capacity of said compressor to a small capacity in response to the absence of said fifth control signal; and comparing said first air temperature with a fifth predetermined temperature in response to the absence of said fifth control signal, providing a sixth control signal when said first air temperature is higher than said fifth predetermined temperature, controlling said capacity changing means to stop the operation of said compressor in response to said sixth control signal.

18. The method of claim 1 further including the step of determining whether said compressor is in an operating state in response to the absence of said first control signal, providing a seventh control signal when said compressor is in said operating state, in the absence of said seventh control signal making said comparison between said difference temperature and said predetermined change in temperature.

19. The method of claim 18 further including the step of responding to the presence of said seventh control signal by detecting said first temperature at the outlet side of said evaporator and detecting said second temperature at the inlet side of said evaporator.

20. The method of claim 17 further including the step of responding to the presence of said second control signal by detecting said first temperature at the outlet side of said evaporator and detecting said second temperature at the inlet side of said evaporator.

21. The method of claim 17 further including the step of responding to the absence of said fourth control signal by detecting said first temperature at the outlet side of said evaporator and detecting said second temperature at the inlet side of said evaporator.

22. The method of claim 17 further including the step of responding to the presence of said fifth control signal by detecting said first temperature at the outlet side of said evaporator and detecting said second temperature at the inlet side of said evaporator.

23. The method of claim 17 further including the step of responding to the presence of said sixth control signal by detecting said first temperature at the outlet side of said evaporator and detecting said second temperature at the inlet side of said evaporator.

24. The method of claim 17 further including the step of responding to the absence of said sixth control signal by detecting said first temperature at the outlet side of said evaporator and detecting said second temperature at the inlet side of said evaporator.

25. The method of claim 17 further including the step of initially controlling said capacity control means to operate said compressor at a small capacity for an initial predetermined time.

* * * * *